(No Model.)
S. G. DENTON.
MAGNIFYING THERMOMETER.
No. 517,446. Patented Apr. 3, 1894.
Fig. 1. Fig. 2.
Fig. 3. Fig. 4.
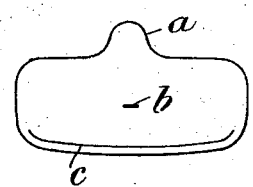 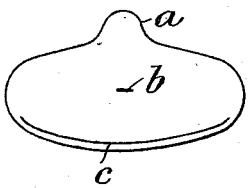
Fig. 5.
OLD FORM.
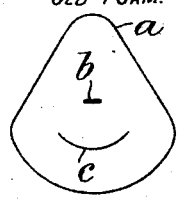
Witnesses
B. W. Miller
G. E. Davis
Inventor
Samuel G. Denton
By his Attorneys
Baldwin Davidson & Wight
THE NATIONAL LITHOGRAPHING COMPANY,
WASHINGTON, D. C.

UNITED STATES PATENT OFFICE.

SAMUEL GEORGE DENTON, OF LONDON, ENGLAND.

MAGNIFYING-THERMOMETER.

SPECIFICATION forming part of Letters Patent No. 517,446, dated April 3, 1894.

Application filed February 9, 1894. Serial No. 499,649. (No model.) Patented in England February 2, 1892, No. 2,023.

*To all whom it may concern:*

Be it known that I, SAMUEL GEORGE DENTON, philosophical-instrument maker, a subject of the Queen of Great Britain, residing at 25ª Hatton Garden, in the city of London, England, have invented certain new and useful Improvements in Lens-Front or Magnifying Thermometers, (for which I have received Letters Patent in Great Britain, No. 2,023, dated February 2, 1892,) of which the following is a specification.

The object of my invention is to facilitate the reading of the divisions and figures engraved on lens-front or magnifying thermometers (especially chemical and clinical thermometers). The thermometer tube I make with flattened bore and enamel strip at the back of the bore in the usual way. The lens (which as is well known only occupies a very small portion of the face or front of the tubing) I form directly over and in a continuous line with the bore of the glass and on each side of the lens I make a flat surface (practically so) on the glass, parallel with the flatness of the bore, on one of these surfaces I engrave the divisions and on the other the figures. By this means both the divisions and figures are more easily seen, they being engraved on a flat front directly facing the eye, instead of on sloping sides running off at an angle as in thermometers now constructed, which as a rule causes most part of the divisions and figures to be out of sight when reading the thermometer. I prefer also to flatten the back of the tubing behind the enamel, this prevents the thermometer's rolling.

Figure 1 of the drawings annexed is a face view and Fig. 2 an end view of a thermometer constructed in the above manner. Figs. 3 and 4 are cross sections on a larger scale showing examples of various forms in which my thermometer tubes may be made. Fig. 5 is a cross section of the former shape.

Heretofore chemical and clinical thermometers have ordinarily been made of a cross section such as shown in Fig. 5, the two opposite sides of the longitudinal lens being continued downward as straight lines inclined to one another as shown to meet the back and on one of these surfaces have been marked the divisions and on the other the figures.

In my thermometer tubes in place of the surfaces on which the divisions and figures are marked being continuations of (that is at tangents to) the curved lens surfaces they are made at an angle to these curved surfaces and approximately parallel with the bore as shown.

One great advantage of flattening the tube in the way shown is that the lens is brought nearer to the bore and consequently if the tube gets twisted when a long length of it is being drawn down to proper form it is of no consequence as the lens and bore both twist together and the bore can always be seen plainly through the lens.

In the drawings $a$ is the lens, $b$ the bore of the tube, and $c$ a strip of white enamel.

What I claim is—

A lens-front or magnifying thermometer tube with the scale-bearing surfaces on either side of the lens approximately in the same plane and at an angle to the sides of the lens in place of being continuations or prolongations of the sides of the lens as heretofore.

SAMUEL GEORGE DENTON.

Witnesses:
G. F. WARREN,
THOMAS LAKE.